United States Patent [19]

Tompson et al.

[11] 4,287,909

[45] Sep. 8, 1981

[54] VALVE FOR DEVELOPING VARIABLE OUTPUT PRESSURE

[76] Inventors: Clement R. Tompson, 3020 LaPorte, Melrose Park, Ill. 60164; Garrett Gruner, 1610 W. Kalamazoo, Lansing, Mich. 48915

[21] Appl. No.: 113,023

[22] Filed: Jan. 17, 1980

Related U.S. Application Data

[62] Division of Ser. No. 46,227, Jun. 7, 1979.

[51] Int. Cl.³ .............................................. G05D 16/06
[52] U.S. Cl. .................................... 137/312; 137/495; 137/505.14; 137/505.37; 137/599
[58] Field of Search .................... 137/312, 495, 505.37, 137/505.14, 505.41, 505.42

[56] References Cited

U.S. PATENT DOCUMENTS

| | | | |
|---|---|---|---|
| 2,031,478 | 2/1936 | Gray | 137/505.42 X |
| 2,147,850 | 2/1939 | MacLean | 137/505.41 X |
| 2,174,515 | 10/1939 | Hughes | 137/505.41 X |
| 2,696,350 | 12/1954 | Cretzler | 137/505.41 X |
| 2,982,300 | 5/1961 | Jackson | 137/495 |
| 3,053,497 | 9/1962 | Fraenkel | 251/77 |
| 3,256,900 | 6/1966 | Estes | 251/140 X |
| 3,635,240 | 1/1972 | Vischulis | 137/495 |

FOREIGN PATENT DOCUMENTS

| | | | |
|---|---|---|---|
| 1240632 | 4/1960 | France | 137/625.65 |
| 196517 | 6/1965 | Sweden | 137/625.65 |

*Primary Examiner*—Robert G. Nilson
*Attorney, Agent, or Firm*—Cook, Wetzel & Egan, Ltd.

[57] ABSTRACT

A valve is disclosed which receives a fluid such as gas at an input port and varies the fluid pressure at the output port in response to an electrical control signal. In one embodiment, a magnet-coil combination responds linearly to a control current to vary the bias on a fluid restriction device to thereby modify the pressure of the fluid at the outlet. In another embodiment, a flexible bellows transmits the force generated by the magnet-coil combination to the fluid restriction device.

9 Claims, 13 Drawing Figures

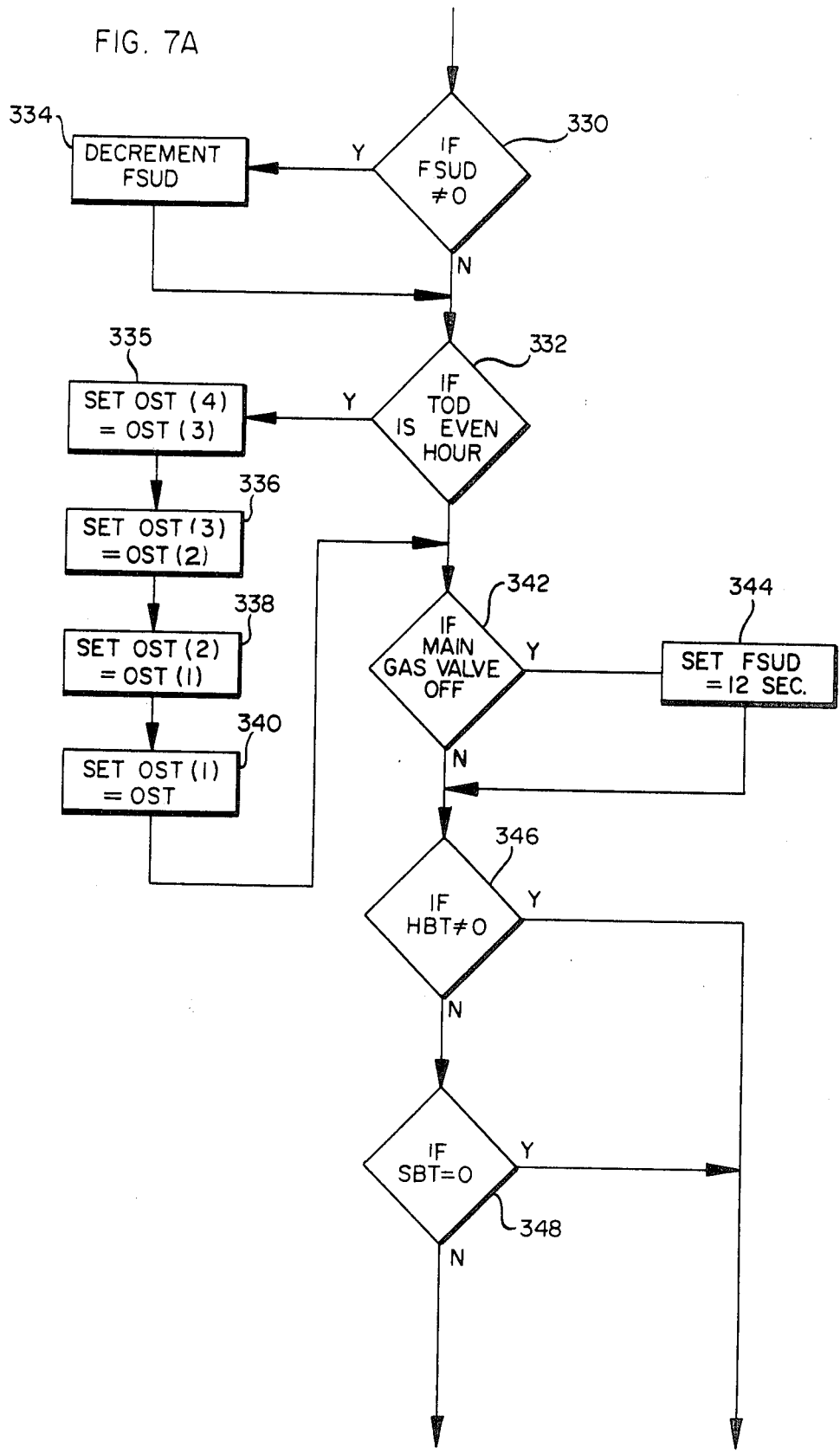

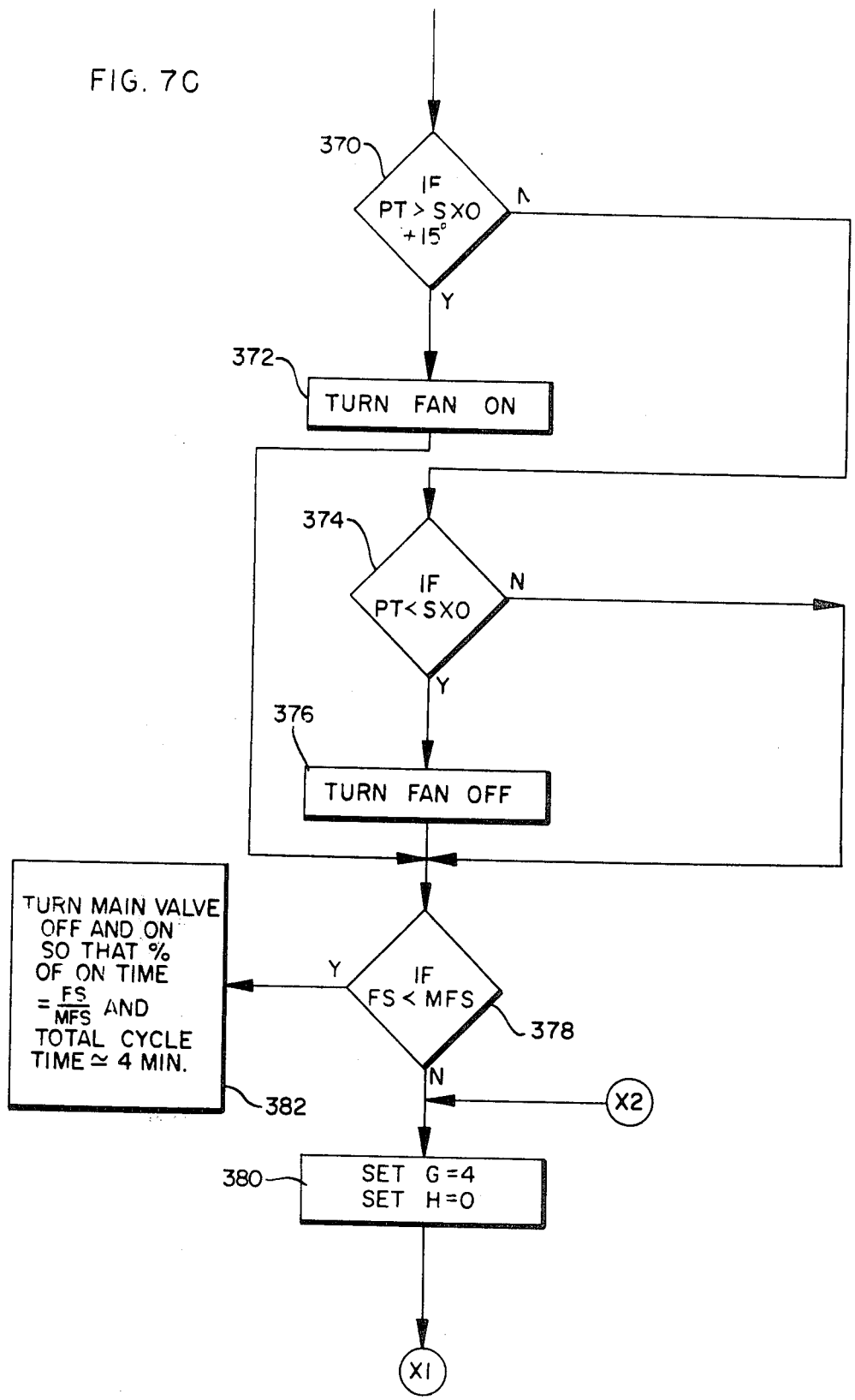

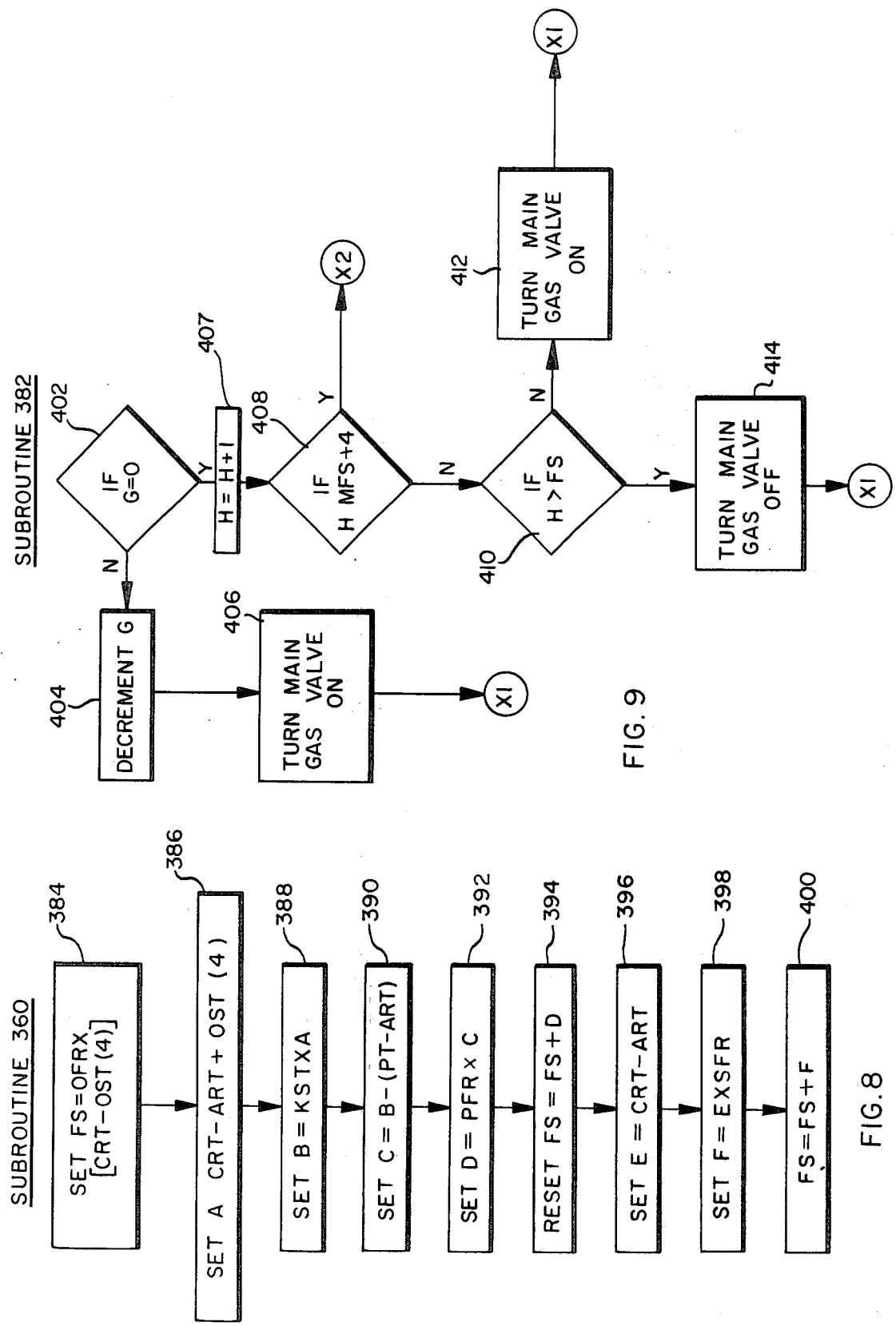

VALVE FOR DEVELOPING VARIABLE OUTPUT PRESSURE

This is a division of application Ser. No. 46,227, filed June 7, 1979.

BACKGROUND OF THE INVENTION

The invention relates generally to furnaces, and is particularly directed to a system for controlling the energy released by a furnace so as to efficiently heat a structure to a desired temperature.

Conventional furnaces, such as those used to heat homes, are designed to heat a structure to approximately 70° F. when the outside air is at its lowest expected temperature, zero degrees, for example. When the outside air is at its lowest expected temperature, the furnace runs continuously at its maximum output. When the outside air temperature is higher than its lowest expected temperature, the furnace runs full on for a while, shuts down for a while, and continuously alternates between full on and full off.

Because of the fact that a conventional furnace runs at full on when it is ignited, the gasses in the flue tend to become overheated. Consequently, flue losses which are proportional to the square of the difference between outside air temperature and flue temperature increase dramatically. Particularly on warmer days is the conventional furnace inefficient because of the fact that it is full on when ignited and much of the heat generated is sent up the flue.

Two additional problems with conventional furnaces arise because of the fact that such a furnace cycles between full on and full off. First, the air heating the structure is frequently warmer than it needs to be, thereby lowering the humidity in the interior of the structure below a level which is comfortable. Secondly, the cycling of the furnace between full on and full off tends to reduce the life of the furnace because of induced stresses from changes in the temperature of the furnace. In addition, moving parts tend to wear out prematurely. All these problems, in addition to the known problem of a period of overheating followed by a period of cooling, render conventional furnaces unsatisfactory. In the present climate of fuel shortages, furnace inefficiency is particularly troublesome.

OBJECTS OF THE INVENTION

It is a general object of the invention to provide an improved method and system for increasing the efficiency of a furnace.

It is a more particular object of the invention to provide such a method and system which is adapted to be retro-fitted to a conventional furnace.

It is another object of the invention to provide a system as set forth above which causes a furnace to heat a structure evenly at reduced fuel consumption.

It is yet another object of the invention to provide such a system which is compatible with existing safety regulations and with which pre-existing controls and safety devices remain operational.

It is another object of the invention to provide an improved valve for accurately regulating the flow of gas to a furnace.

BRIEF DESCRIPTION OF THE FIGURES

The objects stated above and other objects of the invention are set forth more particularly in the following detailed description and in the accompanying drawings, of which:

FIGS. 7, 7A, 7B, 7C, 8, and 9 are flow charts for programming the microprocessor of FIG. 6.

SUMMARY OF THE INVENTION

Broadly stated, the invention includes measuring outside temperature and adjusting the rate of flow of fuel to the furnace as a function of the difference between the outside temperature and the desired temperature of the structure to develop a given size of fire in the furnace. Refinement of the fire size is effected by measuring the temperature of the furnace's heat exchange fluid and the actual temperature of the structure, and by altering the rate of fuel flow as a function of the difference between the temperature of the heat exchange fluid and the temperature of the structure. Further refinement of the fire size is effected by altering the rate of fuel flow as a function of the difference between the temperature of the interior of the structure and its desired temperature. As a result of such control over the rate of fuel flow to the furnace, the furnace burns substantially continuously but at a fire size which is usually much lower than that of a conventional furnace. Substantial fuel savings result.

According to another aspect of the invention, a novel gap regulator valve responds linearly to a fire size signal developed according to the method described above, and regulates the rate of flow of fuel to the furnace.

DESCRIPTION OF THE PREFERRED EMBODIMENT

In conventional gas heating systems for homes, a gas line enters the home and feeds a main gas valve, the output of the valve being coupled to the burner or burners of a furnace. Controls associated with the furnace turn the main gas valve off and on so that the furnace is either full on or full off. As stated above, this mode of operation renders the furnace very inefficient.

In the heating method and system of the invention, the main gas valve is left normally open, and an auxiliary gas valve is included in the gas line between the main gas valve and the furnace's burner. The auxiliary valve is designed to accept a control signal from a control system described hereinafter for varying the fuel input rate to the furnace to control the size of the fire. The fuel input rate is varied in accordance with various parameters described hereinafter so that the furnace is usually operated continuously at less than full fire.

Figure 1:
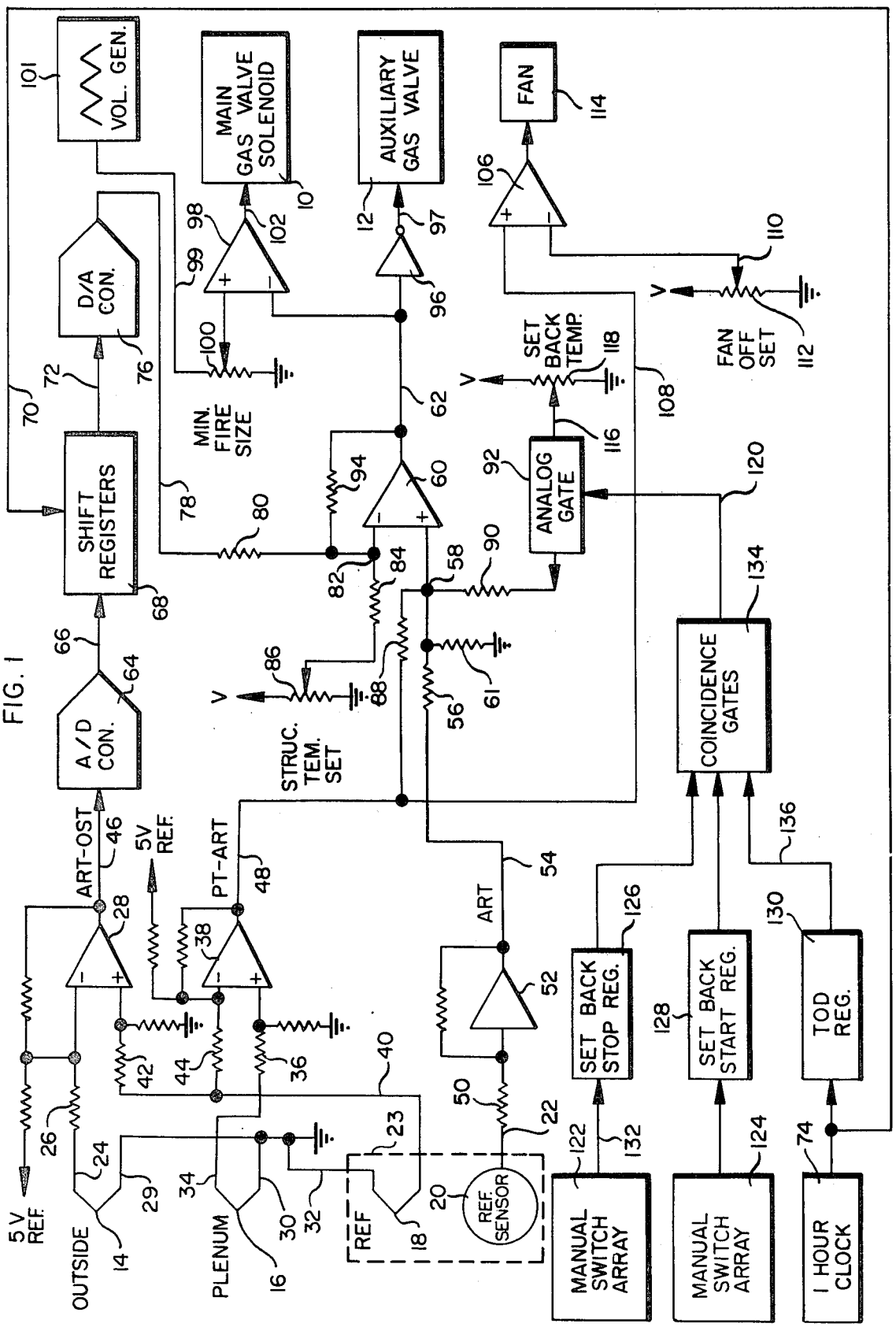
FIG. 1 illustrates a system for adjusting the rate of fuel flow to a furnace according to the invention.

Referring now to the Figures in which like elements are identified by the same reference numeral, and particularly to FIG. 1, there is shown a control system for implementing the furnace control method of the invention. Shown schematically is a conventional main gas valve solenoid 10 for opening and closing the customary main gas valve (not shown). Normally, the solenoid 10 will hold the main gas valve open so that the flow of gas to the furnace (not shown) is controlled by the auxiliary gas valve 12 described in detail hereinafter.

To provide the parameters for controlling the auxiliary valve 12, the illustrated system includes three temperature sensors in the form of copper-constatan thermocouple junctions 14, 16, and 18 and a reference temperature sensor 20. The thermacouple junction 14 is situtated outside the structure to be heated for sensing outside temperature. The thermocouple junction 16 is situated so as to sense the temperature of the furnaces's heat exchange fluid. In the case where the furnace is forced air, the thermocouple junction 16 is mounted on the furnace's plenum to measure plenum temperature. In a hot water system, the junction 16 is situated to sense the temperature of the hot water.

The thermocouple junction 18 is mounted inside the structure for measuring the actual internal structure temperature. The reference sensor 20 is also mounted inside the structure and functions to provide at its output lead 22 a signal indicative of the absolute internal temperature. Preferably, the sensor 20 includes matched transistor junctions for developing the signal at lead 22 and may be an REF-02 device manufactured by Precision Monolithics Incorporated (PMI) of Santa Clara, Calif. As indicated by the dashed line 23, the junction 18 and the sensor 20 are preferably located closely adjacent each other so that they are responsive to the same temperature.

The thermocouple junction 14 has one lead 24 thereof coupled through a resistor 26 to the negative input terminal of an operational amplifier 28, and the other lead 29 thereof coupled to leads 30 and 32 of thermocouple junctions 16 and 18, and thence to ground.

The other lead 34 of the junction 16 is coupled through a resistor 36 to the positive input terminal of an operational amplifier 38. Another lead 40 of the thermocouple junction 18 is coupled through resistors 42 and 44 to the positive input terminal of the amplifier 28 and to the negative input terminal of the amplifier 38, respectively.

As a result of the illustrated arrangement, the amplifier 28 receives, at its negative and positive terminals, signals representative of outside temperature (OST) and actual room temperature (ART), respectively, and develops at its output 46 a signal indicative of the difference, i.e., ART—OST.

Likewise, the amplifier 38 receives at its negative and positive terminals signals indicative of actual room temperature (ART) and plenum temperature (PT), respectively, and develops at its output 48 a signal representative of the difference, i.e., PT—ART.

Referring to the sensor 20, its output 22 is coupled through a resistor 50 to the input of another amplifier 52, the output of which at lead 54 is a signal indicative of the actual room temperature (ART). The latter signal is coupled through a proportioning resistor 56 to a current summing node 58, the latter being grounded by a resistor 61 and being connected to the positive input of an operational amplifier 60. As is described in more detail below, the amplifier 60 serves to develop a control signal at its output lead 62 for controlling the fuel input rate, and thus the fire size, of the furnace.

The output of the amplifier 28 may be coupled to a conventional analog-to-digital (A/D) converter 64 for developing at lead 66 a digital signal representative of the difference signal ART-OST. That digital signal is preferably fed to a delay device 68 for delaying the digitized difference signal for a selected interval. The delay device 68 may take the form of conventional shift registers which, when clocked by a signal on a lead 70, develop on lead 72 a signal which is delayed from the signal on lead 66 by a predetermined interval. For many residential structures, a delay of about four hours has been found to be satisfactory, in which case the delay device 68 may include five stages of eight shift registers clocked by one hour clock 74. Accordingly, in the steady state condition, the signal on the lead 72 is indicative of the difference ART-OST four hours earlier than a present difference signal on the lead 46. In other words, the signal on the lead 72 represents the difference between actual room temperature and outside temperature as it existed four hours ago. It should also be noted that delaying the signal ART-OST is not absolutely required. However, better performance of the heating system is obtained with a one to four hour delay, although the magnitude of the delay is not critical.

The digital signal on the lead 72 is coupled to a conventional digital-to-analog converter 76 for developing an analog signal on lead 78 representative of the delayed difference signal ART-OST. The delayed analog signal is coupled via a proportioning resistor 80 to a current summing node 82, the latter being coupled to the negative input terminal of the amplifier 60. Another input of the node 82 is through another proportioning resistor 84 from a variable resistor 86 coupled between ground and a supply voltage. The latter resistor is included to allow an operator to input to the node 82 a signal representative of the desired room temperature (DRT).

Another input to the amplifier 60 is a proportioned difference signal PT-ART. Specifically, the signal PT-ART on the lead 48 is coupled via proportioning resistor 88 to the node 58. Another resistor 90 couples to the node 58 a signal from an analog gate 92, the function of which is described hereinafter.

It will be appreciated that the resistors 80 and 84, and a feedback resistor 94 around the amplifier 60, function to sum at the node 82 the various currents which they carry. Similarly, the resistors 56, 61, 88 and 90 sum at the node 58 the current which they carry, the resistors 61 and 94 being preferably of equal value. Hence, the output of the amplifier 60 is a function of the currents summed at the nodes 58 and 82. Moreover, the various summing resistors preferably have values which render the amplifier 60 more sensitive to certain signals than to other signals. By properly proportioning the various signals such as ART, PT-ART, etc., by appropriate selection of values for the summing resistors, the sensitivity of the amplifier 60 to a given signal can be tailored to meet various rquirements. The proportioning preferably effected is described in more detail below.

To describe the method by which the rate of fuel to the furnace is varied, it is assumed that the system is in a steady state condition with a constant plenum temperature, a constant actual room temperature, and the resistor 86 has been set for a given DRT. Assuming further that the outside temperature drops, the signals on the leads 46 and 78 change in a negative direction. Consequently, the signal output of the amplifier 60 on lead 62 goes more positive. The latter signal is inverted by an inverter 96 and applied to the auxiliary gas valve 12 via lead 97. The gas valve responds by increasing the fuel input rate to the furnace, whereby fire size is increased. Such an increase is a function of the difference between the desired room temperature and the outside temperature. Where the delay 68 is included for delaying the difference signal ART-OST for four hours, the increase in fire size is a function of the difference between the desired room temperature and outside temperature as it existed four hours ago. Hence, an immediate change in outside temperature preferably causes no immediate change in fire size, thus accounting for the fact that the structure ordinarily does not experience a significant heat loss (or gain) instantly as outside temperature changes.

To illustrate the fact that the above-described change in fire size occurs as a consequence of the change in the outside temperature, it will be appreciated that any such change results from an opposition of "bucking" action between the signal DRT from the resistor 86 and the signal on lead 78, the other signals being quiescent.

To ensure that the desired change in fire size occurs and to accurately "forecast" the heat requirements of the structure as temperature changes, the resistors 80, 84, and 94 are proportioned in accordance with a factor referred to herein as an "outside fire ratio" (OFR) factor. The OFR factor is a constant for a given class of structures and furnaces and proportions the signals received via resistors 80 and 84 so that the amplifier 60 develops a signal representative of maximum fire size when the outside temperature is at the lowest value which the furnace is designed to accommodate. The value of OFR may be determined by setting the furnace to an arbitrary test fire size, waiting for equilibrium to occure in structure temperature, and measuring the outside temperature. The factor OFR is calculated by determining the ratio of the test fire size to maximum fire size, determining the difference between structure temperature and outside temperature, and dividing the ratio by the difference.

In the embodiment of FIG. 1, the signal inputs to the node 82 are proportioned by the OFR factor by selecting the resistors 80, 84, and 94 such that the OFR factor substantially equals A divided by B, where A equals the resistance value of resistor 94 and B equals the resistance value of the resistor 80.

The above-described method of setting the furnace's fire size is essentially a feed-forward scheme as opposed to a feed-back scheme whereby the energy requirements of the structure are roughly forecast. In some applications, the forecast is accurate enough so that further refinement of the fire size is unnecessary. However, it is preferable to further adjust fire size as a function of the difference between the temperature of the heat exchange fluid and the actual temperature of the interior of the structure. This adjustment overcomes unpredictable variations in heating plant performance, and is effected in the system of FIG. 1 by the proportional summing at node 58 of the signals on the lead 48. Assuming, for example, that the only change in temperature is that of the plenum, the signal on the node 58 changes proportionately, in response to which the amplifier 60 varies the control signal on lead 62 to modify the setting of the auxiliary gas valve 12. Specifically, if plenum temperature increases, the signal on lead 48 changes in a negative direction, the signal at the positive input terminal of the amplifier 60 changes in a negative direction, the signal on lead 97 changes in a positive direction, and the gas valve 12 responds by reducing the rate of fuel input to the furnace.

The signals which effect a fire size change as a function of the temperature difference between the plenum and the actual room temperature are proportioned to obtain the correct plenum temperature for a given desired structure temperature and outside temperature, taking into consideration the particular structure and furnace. Specifically, the ratio of the value of the resistor 61 to the value of the resistor 88 is selected such that it is substantially equal to a factor referred to herein as a "plenum fire ratio" (PFR) factor.

The PFR factor is a measure of the percent change in fire size required to change the temperature of the plenum of heat exchange fluid by one degree. To determine the appropriate value for the PFR factor, the furnace is started at an arbitrary fire size (fire size 1) and, when equilibrium is reached, a measurement is made of plenum temperature (plenum temperature 1). The fire size is then changed (fire size 2) and, when equilibrium is reached, the plenum temperature (plenum temperature 2) is measured again. The value for PFR is equal to: (fire size 1-fire size 2) divided by (plenum temperature 1-plenum temperature 2).

To further refine fire size, it is preferred to additionally change the rate of fuel input to the furnace as a function of the difference between the actual temperature of the structure and its desired temperature. As shown, a signal representative of actual structure temperature is developed on lead 54 and a signal representative of desired room (structure) temperature is received from the resistor 86. Both such signals are proportioned such that their difference modifies the control signal on lead 62 for adjusting the valve 12. Assuming, for example, that all other temperatures are relatively constant, an increase in room temperature results in a positive change in the signal on lead 22, a negative change in the signal on the lead 54, a negative change in the signal at the positive input to the amplifier 60, and a positive change in the signal at the lead 97, whereupon the valve 12 reduces the rate of flow of fuel to the furnace and, therefore, reduces the size of the fire.

Preferably, the ART and DRT signals are proportioned in accordance with a factor referred to herein as a "structure fire ratio" (SFR) factor indicative of the percent change in full fire size desired for a difference in the internal structure temperature of one degree. This factor may be determined empirically and is typically about 8% for structures in the middle west region of the United States.

To proportion the ART and DRT signals according to the SFR factor, the value of resistor 56 divided by the value of the resistor 61 is set equal to the desired SFR factor.

Although the variation in fire size effected in response to changes sensed by the thermocouples and the reference sensor have been described and occurring sequentially, it will be appreciated that the amplifier 60 is responsive to multiple, simultaneous parameter changes. The relative effect of such parameter changes is easily adjusted for any desired application by, for example, changing the proportioning factors applied to the various signals. In that way, the sensitivity of the amplifier 60 to a given temperature change is adjustable. In practice, however, the proportioning factors described above have been found to be very effective.

In addition to regulating the furnace's fire size, the system of FIG. 1 also provides other functions. Specifically, there is included a comparator 98 whose negative input terminal is coupled to the lead 62 for sensing the control signal. The positive input terminal of the comparator 98 is coupled to a variable resistor 100 which is grounded at one end, its opposite end being coupled via a lead 99 to a triangular wave voltage generator 101. By adjusting the resistor 100, the positive input terminal of the comparator 98 receives a voltage which varies between zero and the minimum fire size periodically in a sawtooth waveform. This waveform intersects the control signal at regular intervals if the control signal is too small to establish the minimum fire size at which the furnace is to operate. Hence, when the control signal is smaller in amplitude than the minimum fire size signal, the comparator 98 develops an output at leads 102 for application to the main gas valve solenoid 10. The solenoid 10 closes the main gas valve intermittently to inhibit the furnace from operating with a flame that is too small. The ratio of gas-on time to gas-off time varies so that the heat developed by the furnace is thereby altered to adapt to variable heat demands.

The system of FIG. 1 also includes means for turning a furnace's blower fan off and on, depending on the difference between the plenum temperature and the actual room temperature so as to avoid blowing cool air into the structure. This latter function is effected by a comparator 106 whose positive input terminal receives the signal representative of the difference between the plenum temperature and the actual room temperature via lead 108. The negative input terminal of the comparator 106 is coupled to the wiper arm of a variable resistor 112 via lead 110. One end of the resistor 112 is grounded and its other end is connected to a supply voltage so that the wiper arm may select for input to the comparator 106 a signal for controlling the on and off temperature of the furnace's fan 114. Preferably, the comparator 106 includes 15° of hysterysis so that the fan 114 is turned on when the signal on lead 108 is greater than the signal on the lead 110 by a factor representative of 15°. The fan 114 is turned off when the signal on the lead 110 is less than the amplitude of the signal on the lead 108. In hot water heating systems, the fan 114 is, of course, replaced by a water pump which circulates heated water.

The illustrated system also includes means for reducing the heat output of the furnace at night, for example, and for increasing the heat output of the furnace back to a normal level during other times. For this purpose, the system includes an analog gate 92 which receives a signal on a lead 116 representative of the amount by which the structure temperature is to be reduced or "set back". The lead 116 couples to the wiper arm of a variable resistor 118 coupled between ground and a source of voltage. Adjustment of the wiper arm thus provides a signal indicative of the amount by which the structure temperature is to be reduced.

The gate 92 receives another signal via a lead 120 which is indicative of the time to initiate the temperature set back and the time to restore the system to normal operation. To develop the signal on lead 120, the system includes a pair of manual switch arrays 122 and 124, a set back stop register 126, a set back start register 128, and a time-of-day register 130. The switch arrays 122 and 124 may be a conventional combination of manually operable switches which generate a binary output on the lead 132 representative of the time-of-day at which the system is to be set back or is to be restored to normal operation. That information is stored in the registers 126 and 128 whose outputs are applied to coincidence gates 134.

The time-of-day register 130 receives an input from the one hour clock 74 for generating an output at lead 136 representative of the time-of-day. When this signal is less than or equal to the setting of array 122 and is also greater than the setting in array 124, a signal is developed on the lead 120 for triggering the gate 92 and applying to the amplifier 60 a further signal causing the amplifier 60 to modify the control signal which is developed for decreasing the structure temperature at system equilibrium.

Figure 10:
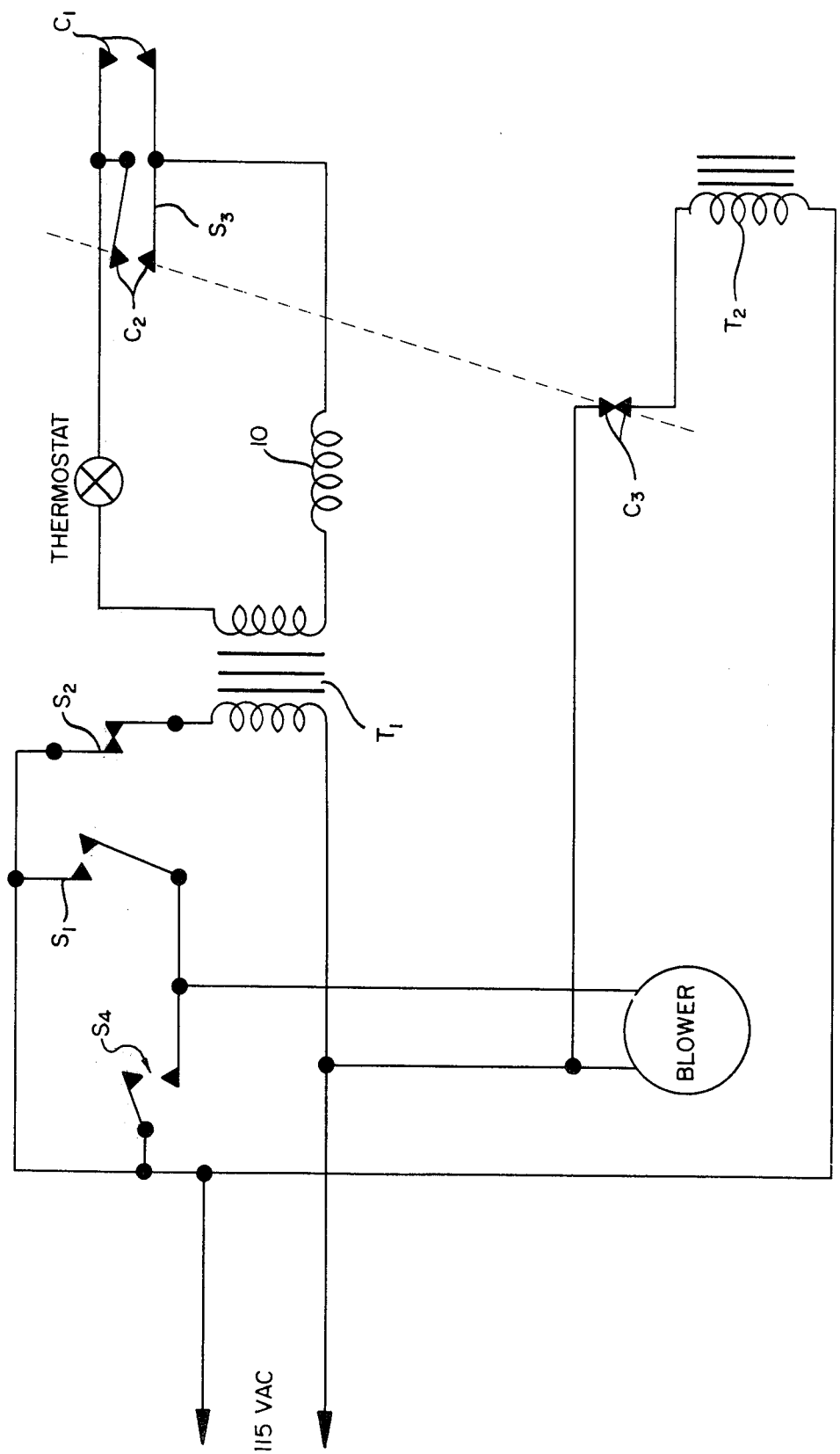
FIG. 10 illustrate how the present systems may be interfaced with conventional furnace controls to return control of the furnace to the conventional controls.

An exemplary but preferred method of interfacing the system of FIG. 1 with a conventional hot air furnace control system is illustrated in FIG. 10. The conventional furnace control system includes a blower in series with a temperature-sensitive blower switch S1, the combination being coupled across the 115 volt power line. The switch S1 is typically located in the plenum and remains open until the temperature of the plenum reaches its operating temperature. Another switch S4 is connected in parallel with S1 and is operated by the comparator 106 in FIG. 1 irrespective of the state of the switch S1.

A transformer T1 is coupled in series with a normally-closed, temperature-sensitive limit switch S2, the combination of which is also coupled across the power line. When the switch S2 is closed, the transformer T1 is energized to provide a low voltage at its secondary for energizing the main gas valve solenoid 10. A conventional thermostat is coupled in series with the solenoid 10 to control the energization.

The conventional furnace control is interfaced with the system of FIG. 1 by inserting in series with the thermostat a pair of relay-operated contacts C1 and a manually operable two pole, two position switch S3 having a first pair of contacts C2 and a second pair of contacts C3. The comparator 98 (FIG. 1) closes the contacts C1 when the main gas valve solenoid 10 is to be energized for opening the main gas valve.

Another transformer T2 is coupled in series with the contacts C3 and the power line to provide a supply voltage for energizing the circuitry of FIG. 1.

Under normal conditions, contacts C2 are open, contacts C3 are closed, and the system of FIG. 1 is active. Also, contacts C1 control the main gas valve solenoid 10 provided that the thermostat is set to a temperature above the desired room temperature established by the system of FIG. 1. Thus, under normal conditions, the thermostat is overridden.

Should the contacts C1 become permanently closed due to system failure, the thermostat assumes control of the structure temperature, thereby reverting the heating system to conventional control.

A system failure which results in the contacts C1 being permanently open is overcome by actuating the switch S3 to close the contacts C2 and to open the contacts C3. Hence power is removed from the system of FIG. 1, and the thermostat again assumes control of structure temperature in the conventional manner.

Figure 2:
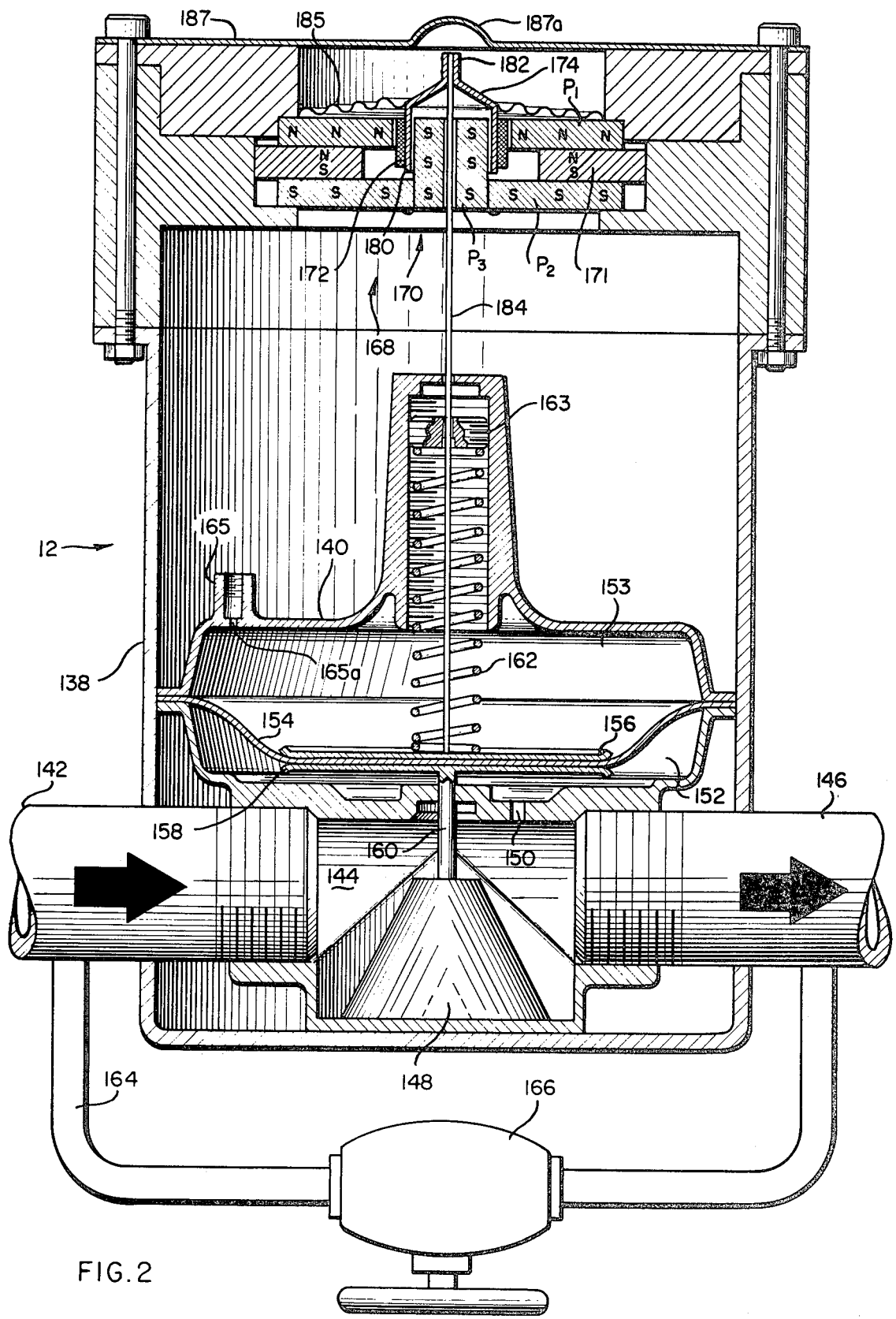
FIG. 2 is a cross-sectional view of a gas regulator valve embodying various aspects of the invention and adapted for use with the system of FIG. 1.

An auxiliary gas valve which has been found suitable for use with the system of FIG. 1 is shown in FIG. 2. The illustrated valve 12 is a modified version of a model RV 52 valve manufactured by the Maxitrol Company of Southfield, Mich. Substantially the entire valve is mounted within a housing 138, the interior of which contains the conventional portion of the valve included within its own housing 140. Conventionally, the valve includes a gas inlet port 42 communicating by way of a gas flow conduit 144 with a gas outlet 146. The inlet 142 receives gas from the conventional main gas valve, and the outlet 146 supplies gas to the burner of the furnace.

Located in the conduit 144 is a restriction device 148 which is adapted to move vertically for increasing or decreasing the flow of gas from the outlet port 146. The outlet side of the conduit 144 includes a port 150 communicating with the conduit 144 and an upper chamber 152. The chamber 152 is sealed from an atmospheric reference chamber 153 by a diaphragm 154. The central portion of the diaphragm is held between a pair of plates 156 and 158, the latter of which is coupled to the restriction device 148 by a rod 160.

Coupled to the top plate 156 is a spring 162 whose upper end is held fixedly inside the housing 140 by a vertically adjustable plug 163 whose vertical position determines the range through which the mechanism will operate. The lower the plug, the greater the force exerted by the spring. The lower end of the spring 162 biases the plate 156 and the diaphragm 154 downwardly against the downstream gas pressure which is in communication with the diaphragm 154 via the port 150. By proper adjustment of the spring 162, the outlet pressure range of the gas is controlled. For a typical installation in which the pressure of the gas at the inlet port 142 is at approximately $3\frac{1}{2}$ inches of water, the spring 162 is selected to bias the diaphragm downwardly for holding the restriction device 148 at a position to develop a gas outlet pressure range of approximately $3\frac{1}{2}$ to $\frac{3}{4}$ inches of water at equilibrium.

Mounted on the housing 140 is a conventional nipple 165 which is normally coupled via a pipe (not shown) to the vicinity of the pilot light. A port 165a couples the chamber 153 to the nipple 165 so that, should a leak occur in the diaphragm 154, the leaking gas is conducted from the chamber 153, through the port 165a, and thence to the vicinity of the pilot light where it is burned.

In normal operation, the port 165a and the nipple 165 insure that chamber 153 is at atmospheric pressure.

As shown, one of the modifications of the valve 12 includes a bypass 164 coupling the inlet side of the valve to its outlet side. The bypass 164 includes an adjustment valve 166 for adjusting the volume of gas exiting from the outlet 146 to a value sufficient to establish a minimum safe flame in the furnace.

The valve is also modified in accordance with other aspects of the invention for regulating the downstream pressure of the gas at outlet 146 in response to the control signal developed by the amplifier 60. To effect such control, the valve 12 includes electro-magnetic means 168 mounted near the top portion of the valve for modifying the bias on the diaphragm 154 and thence the gas outlet pressure as a substantially linear function of the amplitude of the control signal.

Figure 3:
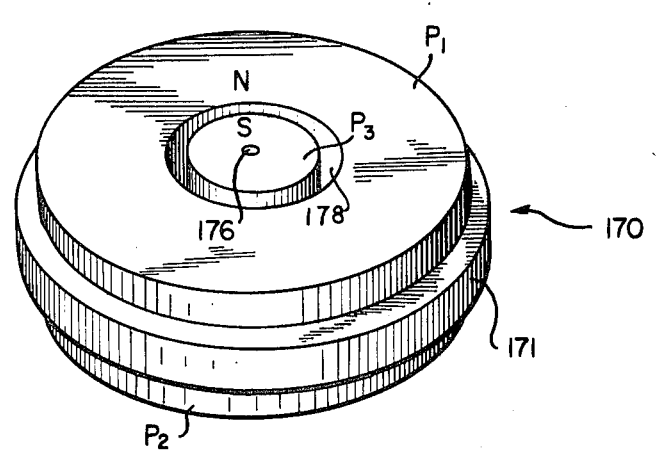
FIG. 3 is a perspective view of an annular magnet employed in the valve of FIG. 2.

In the illustrated embodiment, the electro-magnetic means 168 includes the combination of a magnetic field assembly 170, a coil 172, and an armature in the form of an armature coil form 174. As shown in FIGS. 2 and 3, the assembly 170 includes a ceramic annular permanent magnet 171 having north (N) and south (S) poles as indicated. The magnet 171 is sandwiched between an upper, permeable pole piece P1 and a lower, permeable pole piece P2. A permeable extension P3 of the pole piece P2 extends upwardly from P2 through a circular opening in the pole piece P1 so as to define a circular gap 178 between the pole pieces P1 and P3. The gap 178 provides a non-magnetically permeable separation between the north and south poles of the pole pieces P1 and P3. A small central aperture 176 is provided through the pole piece P3.

The armature coil form 174 has an upstanding side wall 180 which is disposed in the gap 178 as shown in FIG. 2. The coil 172 is wrapped around the coil form 174 and is also disposed in the gap 178. The side wall of the coil form 174 tapers upwardly to a nipple 182 whose underside is coupled to a cable 184. The cable 184 extends downwardly from the nipple 182 and passes through an opening in the upper portion of the housing 140, extending further down through the spring 162 and coupled at its end at a point on the spring near the plate 156 or to the top of the plate 156 directly.

Mounted near the top of the valve is a circular, flexible, diaphragm-like member 185 which surrounds the coil form 174. The member 185 is adhered to the outer periphery of the pole piece P1 as shown and to the upper surface of the coil form 174. With this arrangement, the member 185 tends to hold the coil form 174 in a centered position and acts as a shield to prevent dust from entering the interior of the electro-magnetic means 168. A non-magnetically permeable dust cover 187 is provided to cover the electro-magnetic means 168. The cover 187 includes an upwardly extending embossment 187a to provide room for upward travel of the armature 174.

The operation of the electro-magnetic means 168 is very much like that of the voice coil of a conventional audio speaker. That is, the coil 172 receives control signal current from the amplifier 96, and the force created by the interaction of the magnetic flux of the magnet 170 and the field associated with the coil 172 urges the coil form 174 to move vertically in the groove 178. This arrangement provides for a linear force on the coil form 174 as a function of the control signal current received by the coil 172. The linear force on the coil form 174 is transmitted to the diaphragm 154 via the cable 184 so as to vary the bias on the diaphragm and thereby vary the equilibrum position of the restriction device 148. It should also be noted that the amplitude of the current in the coil 172 required to provide a given amount of travel force on the diaphragm 154 depends on the vertical position of the plug 163. The lower the plug, the larger that current must be.

Preferably, the coil form 174 is constructed of a nonferrous metal such as brass to eddy current dampen its motion and thus reduce its tendency to vibrate rapidly and to conduct heat away from the coil.

From the description set forth above, it will be apparent that any reduction in the amplitude of the control signal at the output of the inverter 96 results in less current flow in the coil 172. Consequently, the coil form 174 rides downwardly in the groove 178 to permit the spring 162 to flex the diaphragm 154 downwardly and urge the restriction device 148 to a position where the gas conduit 144 is more open, resulting therefore in an increase in the pressure of gas from the outlet 146. Conversely, when the current applied to the coil 172 increases, the coil form 174 rides upwardly in the groove 178 to pull the cable 184 upwardly and aid in compressing the spring 162. As a result, the diaphragm 154 moves upwardly by the downstream gas pressure, via port 150, carrying with it the restriction device 148. Thus, the pressure of gas from the outlet 146 is reduced.

In equilibrium, the spring 162 counterbalances the upwardly directed pull of the cable 184 and the downstream pressure of the gas at the outlet 146. Should the electro-magnet 168 fail, or the system fail to develop a control signal, the coil form 174 merely slides downwardly in the groove 178, whereupon the upward pressure on the spring 162 is reduced, and the latter urges the restriction device 148 to its highest pressure position. Under those circumstances, the furnace operates conventionally, i.e., either full off or full on in response to the conventional controls originally supplied with the furnace, none of which are removed or disabled to accommodate the invention.

When the control system of FIG. 1 operates normally, the control signal which is developed regulates in a linear manner the rate of flow of gas to the furnace as a function of the parameters discussed above. The effect is that the furnace remains almost continually ignited at the optimum fire size required by the environment to heat and hold the structure to its desired temperature.

Figure 4:
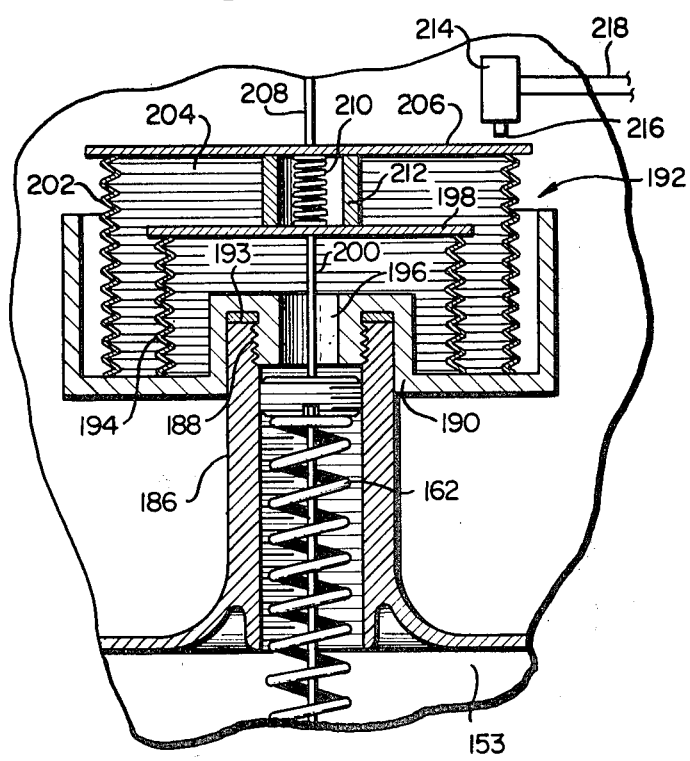
FIG. 4 is a cross-sectional view of a further improvement to the valve shown in FIG. 2.

A further modification to the valve 12 which improves its safety and provides additional protection against gas leaks in the valve is illustrated in FIG. 4. With the illustrated modification, electrical circuits are also isolated from gas conduits, the heating system is returned to control by the conventional furnace controls in the event of failure of the present control system, and an alarm signal is generated to indicate such failure. The illustrated modification fits generally between the nipple 182 of the armature coil form 174 and the top of the conventional valve housing 140. In FIG. 4, the upper end of the housing 140 is shown at 186, the upper and inner ends thereof having threads 188 for mating with adjacent threads in a metal base 190 which carries bellows means identified generally at 192 and which supports the electro-magnetic means 168 of FIG. 2. A sealing washer 193 is situated between the base 190 and the upper housing portion 186.

The bellows means 192 includes a first bellows 194 which surrounds an opening 196 in the upper portion 186 of the conventional valve housing. The bellows 194 carries a top plate 198 to which is coupled one end of a cable 200 as shown. The other end of the cable 200 connects to the bottom of the spring 162 shown in FIG. 2. With the illustrated position of the bellows 194, the latter defines an isolated pressure region between the diaphgram 154 (FIG. 2) and the bellows 194 and thereby isolates the atmospheric reference chamber 153. The base 190 to which the bellows 194 is sealed also operates to seal the reference chamber 153 from the atmosphere. Hence, should any leak develop in the diaphragm 154 gas will be contained within the opening 196 and the chamber 153 by the sealing action of the bellows 194, the sealing washer 193, and the base 190, thus preventing gas from reaching the atmosphere (except via port 165a of FIG. 2) or the electrical circuitry associated with the electromagnetic means 168.

To further contain the gas, the bellows means 192 includes a second bellows 202 mounted as shown on the base 190 and sealed thereto independently of the seal between the base and the bellows 194 to seal the first bellows 194 from the atmosphere, and to define a low pressure or vacuum chamber 204 defined by the first and second bellows and the base 190. In the arrangement shown, the base 190 operates to seal low pressure chamber 204 from the atmosphere.

The second bellows 202 also carries a top plate 206 which couples to the bottom of a cable 208. The upper end of the cable 208 connects to the nipple 182 of the coil form 174 as shown in FIG. 2.

Located between the plates 206 and 198 is a compressed spring 210 surrounded by a spacer 212, the latter of which sets the minimum distance between the plates 198 and 206. Closely adjacent the top plate 206 is a switch 214 carrying a button 216, the function of which is described hereinafter.

In operation, an increase of current through the coil 172 causes the coil form 174 to move upwardly, thereby pulling the cable 208 upwardly. The upward motion of the cable is transmitted from the top plate 206 to the plate 198 through the chamber 204 via spacer 212 as long as a sub-atmospheric pressure exists in chamber 204, thereby transmitting that upward motion to the cable 200. Consequently, the cable 200 pulls the diaphragm 154 upwardly as well as the restriction device 148, thereby reducing the equilibrium pressure of gas at the outlet 146. Conversely, a reduction in current in the coil 172 results in an increase in the equilibrium pressure of gas at the outlet 146. To this extent, the operation of the valve 12 is very much the same as that described with reference to FIG. 2. With the improvement illustrated in FIG. 4, however, any leak in the diaphragm 154 is contained both by the bellows 194 and the bellows 202. Should a leak occur in either of the bellows 194 or 202, the vacuum or low pressure in the chamber 204 will be lost, thereby permitting the compressed spring 210 to spread the plates 198 and 206 apart. The resulting downward movement of the plate 198 relaxes tension on the cable 200 sufficiently to permit the valve to open to its highest pressure position. The upward movement of the plate 206 extends only the bellows 202 and has no effect on the diaphragm 154. That upward motion applies pressure to the button 216 for actuating the switch 214. The leads 218 from the switch 214 are adapted to carry a signal for actuating an alarm to indicate the fact that a leak has occurred in the bellows. The same signal on the leads 218 may be coupled to a safety circuit of the furnace to shut the heating system down in the same manner as a conventional limit switch.

Once the sub-atmospheric pressure is gone from chamber 204, no forces from the armature 174 which would reduce equilibrium gas pressure at outlet 146 can be communicated to the cable 200.

It should be noted that, should a leak occur in either of the bellows 194 or 202, or should a break occur in either of the seals between the base 190 and the bellows 194 and 202, there still will be no leak of gas to the atmosphere. The only situation in which gas could leak to the atmosphere is that wherein there is a leak in the diaphragm 154 in addition to leaks in both of the bellows 194 and 202, a highly unlikely condition. It should be noted that further protection against gas leaks is afforded by the action of switch 214 in closing the main gas valve 10 upstream from the control valve.

Figure 5:
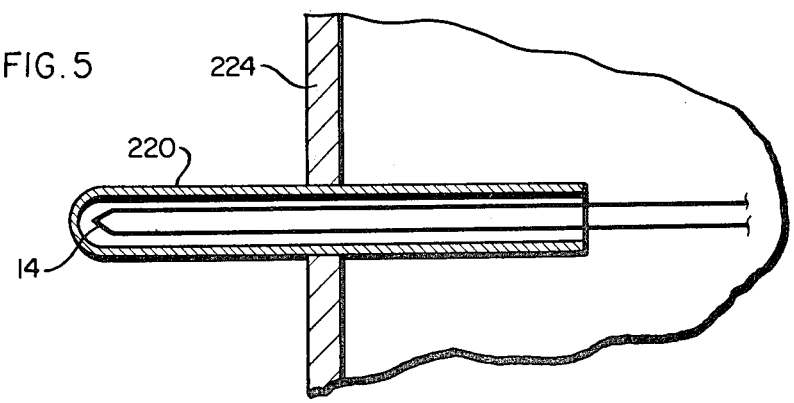
FIG. 5 illustrates an outside temperature sensor according to another aspect of the invention.

Although the system described thus far works satisfactorily, it has been found that improved performance can be achieved, particularly under severe wind chill conditions, according to a further aspect of the invention. It will be appreciated that on cold windy days the resultant wind chill factor causes a structure to lose heat more rapidly than when there is little or no wind. To compensate for this wind chill effect, the outside thermocouple junction 14 is preferably mounted within a heat conductive tube as shown in FIG. 5. As shown, a hollow tube 220 extends through an outside wall 224 of the structure which is being heated and carries within it the thermocouple junction 14. The end of the tube 220 external to the structure is closed as shown, with the inner portion thereof open so that the leads from the thermocouple junction 14 can be connected to the remainder of the control system. With this arrangement, the tube 220, preferably of copper, protects the thermocouple junction from damage and conducts heat from the inside of the structure to the junction 14, and thus heats the thermocouple junction 14 accordingly. The junction thus becomes an outside chill sensor which is warmer in still air than the outside temperature and cooler in moving air. Consequently, the signal developed by the thermocouple junction 14 enables the control system to heat the structure so as to compensate for the wind chill factor.

Preferably, the tube 220 is mounted so that it is horizontally movable to change the ratio of outside-exposed tube to that portion of the tube which is located in the interior of the structure. By so adjusting the position of the tube 220, it is possible to tailor the chill sensitivity of the thermocouple junction 14 to match the structure in which it is installed. For example, where the tube 220 extends through the wall of a cool basement, it should be positioned to expose more of the tube 220 to the interior of the structure. Conversely, when the tube 220 extends through the wall of a warmer space, such as a bedroom, it is positioned to expose less surface of the tube 220 to the interior of the structure and more of it to the exterior of the structure.

Figure 6:
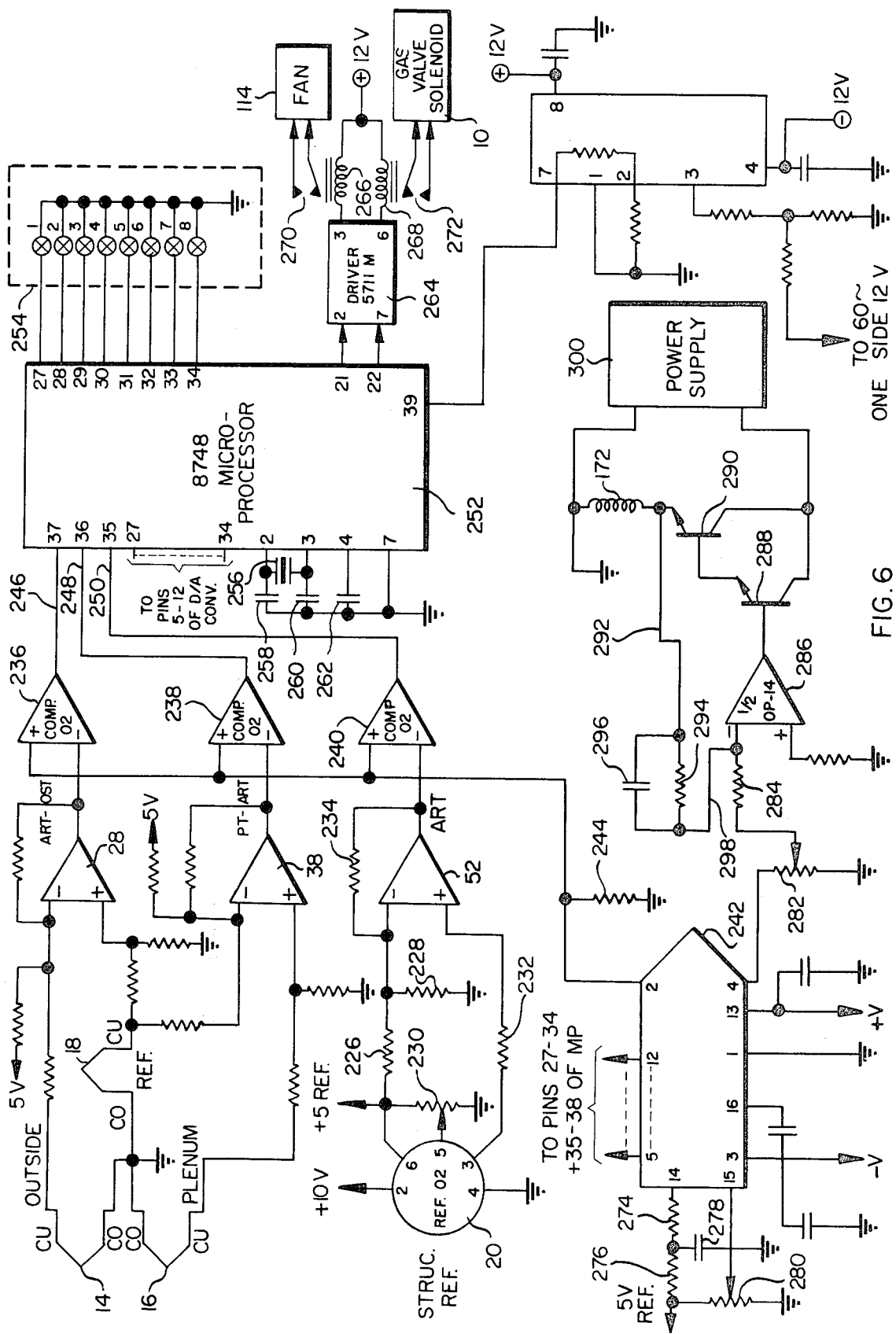
FIG. 6 illustrates a microprocessor-controlled system for altering fuel flow to a furnace according to the invention.

The embodiment illustrated above with reference to FIG. 1 may be modified to provide greater flexibility in the control of fire size by replacing certain portions of the FIG. 1 embodiment with a programmed microprocessor. Such a modification is illustrated in FIG. 6 to which reference is now made. As shown, the FIG. 6 embodiment includes the thermocouple junctions 14, 16, and 18 coupled to a pair of amplifiers 28 and 38 to develop signals representative of the difference between the actual room temperature and outside temperature (ART-OST) and the difference between the plenum temperature and the actual room temperature (PT-ART). This part of the structure is much the same as that shown in FIG. 1. In addition, the embodiment of FIG. 6 includes the structure reference 20 coupled to an amplifier 52 to develop a signal representative of the actual value of the room temperature. More detail is also shown of the coupling structure between the structure reference 20 and the amplifier 52. Specifically, pin 6 of the reference 20 is coupled to the negative terminal of the amplifier 52 by a resistor 226, the junction between resistor 226 and the negative terminal of the amplifier 52 being coupled to ground by resistor 228. The junction between pin 6 of the reference 20 and the resistor 226 is grounded through a rheostat 230, the wiper arm of which is coupled to pin 5 of the reference 20. Pin 3 of the structure reference 20 is coupled to the positive terminal of the amplifier 52 through another resistor 232. In setting up the system, the rheostate 230 is adjusted so that the output of the amplifier 52 is approximately equal to minus 510 millivolts at 40° F. With this adjustment, the reference 20 develops a DC voltage at its pin 6 of approximately 5 volts. This 5 volt reference may be used as a supply voltage at other points in the circuit.

The output of the reference 20 at pin 3 is approximately 630 millivolts at 20° C., and changes at a rate of approximately 2.1 millivolts per degree C. To develop the proper change in the output of the amplifier 52, the resistors 226, 228 and a feedback resistor 234 around the amplifier 52 are selected such that the 2.1 millivolt per degree C. signal appearing at the positive terminal of the amplifier 52 is converted to a 10 millivolt per degree F. change at the output of the amplifier 52.

Referring again to the amplifiers 28, 38, and 52, their outputs are coupled to the negative input terminals of comparators 236, 238 and 240, respectively. The positive input terminal of each of the comparators is coupled to pin 2 of a D/A converter 242 which may be a DAC-08C converter manufactured by PMI. Pin 2 of the converter 242 is coupled to ground through a resistor 244.

The output of the comparators 236, 238 and 240 are coupled via leads 246, 248 and 250 to pins 37, 36 and 35, respectively, of a microprocessor 252 manufactured by Intel Corporation of Santa Clara, Calif. Thus, the microprocessor 252 receives signals at pins 37, 36 and 35 representative, respectively, of the difference between the actual room temperature and the outside temperature, the difference between the plenum temperature and the actual room temperature.

Pins 27-34 of the microprocessor 252 serve as both input and output pins. As inputs, they are illustrated along the right edge of the microprocessor 252 receiving signals from a switch 254 which is described in more detail hereinafter. As outputs, pins 27-34 are also shown along the left edge of the microprocessor 252 and are coupled to pins 5-12 of the D/A converter 242. Suffice it to say at this juncture that the microprocessor outputs two types of signals at its pins 27-34, a first of which causes the D/A converter 242 to interrogate the comparators 236, 238 and 240 at their positive input terminals. The second type of signal which the microprocessor sends to pins 5-12 of the converter 242 is a signal indicative of the desired fire size. In response to this latter signal, the converter 242 generates at its output pin 4 a signal for controlling the rate of gas input to the furnace.

For internal clocking of the microprocessor, a 3.5 Megahertz crystal 256 is coupled between pins 2 and 3 of the microprocessor, the latter of which are also coupled via capacitors 258 and 260 to ground. Pin 7 of the microprocessor is coupled directly to ground and pin 4 is grounded through another capacitor 262.

The microprocessor also develops outputs at pins 21 and 22 for transmission to a driver 264 whose outputs at pins 3 and 6 supply current to a pair of relays 266 and 268. The opposite ends of the relays 266 and 268 are coupled to a 12 volt voltage source. When outputs appear at pins 21 and 22 of the microprocessor, the driver 264 energizes the relays 266 and 268 for closing switch contacts 270 (corresponding to contacts S4 in FIG. 10) and 272 (corresponding to contacts C1 in FIG. 10), the latter of which control the operation of the fan 114 and the main gas valve solenoid 10.

Pin 39 of the microprocessor receives a 60 cycle square wave developed by an LM 311 device to permit the microprocessor to update an internal time-of-day clock. Pin 3 of the LM 311 receives a 60 cycle input for conversion thereof to the square wave output of the microprocessor.

Referring again to output pins 27-34 of the microprocessor, those pins carry an 8 bit digital number to pins 5-12 of the converter 242, in response to which the converter develops a corresponding analog voltage at pin 2 thereof for interrogating the comparators 236, 238 and 240. The 8 bit number received by the converter 242 changes incrementally for incrementally changing the voltage at pin 2 of the converter. For example, when the microprocessor is ascertaining the value of the difference signal ARTOST, the digital output of the microprocessor and the analog output and pin 2 of the connector change continuously until the voltage at the positive terminal of the comparator 236 is equal in amplitude to the voltage of the negative terminal thereof. When that occurs, the comparator 236 develops an output at lead 246. Because the microprocessor "knows" the value of the binary signal it developed to trigger the comparator 236, the microporocessor therefore "knows" the value of difference signal ART-OST.

The microprocessor then incrementally changes the digital outputs at pins 27–34 for similarly interrogating the comparators 238 and 240, one at a time. When those comparators fire the microprocessor "knows∞ the value of the difference signal PT-ART and the value of ART from the amplifier 52.

The digital signals which the microprocessor sends to pins 5–12 of the converter 242 vary according to the so-called "successive approximations" theory described at pages 41-1 through 41-23 of a 1977 manual entitled "Microcomputer Users Manual," MCS-48, published by the Intel Corporation of Santa Clara, California. Suffice it to say that the digital outputs at pins 27–34 of the microprocessor vary until they "home in" on the correct value for firing each of the comparators 236, 238 and 240.

After the microprocessor has sensed the signals received at its pins 35–37, it computes the required fire size to bring the structure to its desired temperature, generally according to the method described previously. The microprocessor then sends a digital signal to pins 5–12 of the converter 242 for conversion to an analog signal at pin 4 thereof for adjusting the flow rate of gas to the furnace.

Pin 14 of the converter 242 is connected via resistors 274 and 276 to the 5 volt reference developed by pin 6 of the reference 20. The junction of the resistors 274 and 276 is grounded through a capacitor 278. Pin 15 of the converter 242 is coupled to the wiper arm of a rheostat 280 coupled between ground and the 5 volt reference. The wiper arm of the rheostat 280 is adjusted so that voltage across the resistor 244 is equal to approximately minus 510 millivolts when the digital input to pins 5–12 of the converter 242 is zero.

The output at pin 4 of the converter 242 appears across another rheostat 282, the wiper arm of which is coupled through a resistor 284 to the negative input terminal of an amplifier 286. The output of the amplifier 286 is coupled to the base of a transistor 288 which is interconnected, as shown, with another transistor 290. The emitter of the transistor 290 is coupled to one end of the coil 172 whose other end is grounded. At the junction between the emitter of transistor 290 and the coil 172, a lead 292 connects to a time constant circuit comprising a resistor 294 and a capacitor 296. The opposite end of the time constant circuit is coupled via a lead 298 to the negative input of amplifier 286.

In response to a signal at pin 4 of the converter 242, the amplifier 286 turns on the transistors 288 and 290 which function to supply current to the coil 172, the power for which is supplied by a power supply 300 coupled between ground and the collector terminal of the transistors 288 and 290. The level of current which flows through the coil 172 is, therefore, dependent on the amplitude of the signal developed at pin 4 of the converter 242, which is in turn dependent on the value of the signal it receives at its pins 5–12 from the microprocessor. Varying the current to the coil 172 then varies the rate of gas flow from the auxiliary valve as described above with reference to FIG. 2 and 4.

The function of the time constant network comprising the capacitor 296 and the resistor 294 is to hold the value of the current through the coil 172 at a steady value during the interval when the converter 242 is developing its output at pin 2 for interrogating the comparators 236–240. The rheostat 282 is adjusted so that when the voltage at pin 4 of the converter 242 is zero, full gas flow from the auxiliary valve is obtained, and so that when the converter 242 receives at pins 5–12 a signal representative of half gas flow, the coil 172 receives a current for establishing half of maximum gas flow from the auxiliary valve.

Referring now to the switch 254, that switch is preferably a so-called dual in-line or "DIP" switch having manually operable sub-switches 1–8 thereon. The purpose of the switch 254 is to input to the microprocessor desired values for the time of day, the setback start time, the setback duration, the setback temperature, and the desired room temperature, and a "heat blast" signal. In the illustrated embodiment, each of the sub-switches 1–8 has a given binary weight. For example, sub-switch 1 is associated with a binary weight of 1, sub-switch 2 is associated with a binary weight of 2, sub-switch 3 is associated with a binary weight of 4, etc. Closure of a predetermined combination of the sub-switches 1–8 inputs to the microprocessor the appropriate information.

To input the setback temperature (the number of degrees lower than the normally desired room temperature), the operator closes switch 5 and then employs sub-switches 14 to decrement the 68° nominal setback temperature. To input the desired room temperature, the operator closes switch 4 and then employs sub-switches 1, 2 and 3 to indicate to the microprocessor the degrees above 65° F. desired for room temperature.

In the preferred embodiment, the microprocessor is also capable of effecting a "heat blast" function wherein it increases the furnace's fire size by 20% over normal for a given duration. Such a heat blast might be called for by the operator when, for example, someone in the structure is preparing to bathe. To effect the heat blast function, an operator closes sub-switch 1, in response to which the microprocessor increases the fire size by 20% for a predetermined programmed interval, such as for one hour.

Figure 7:
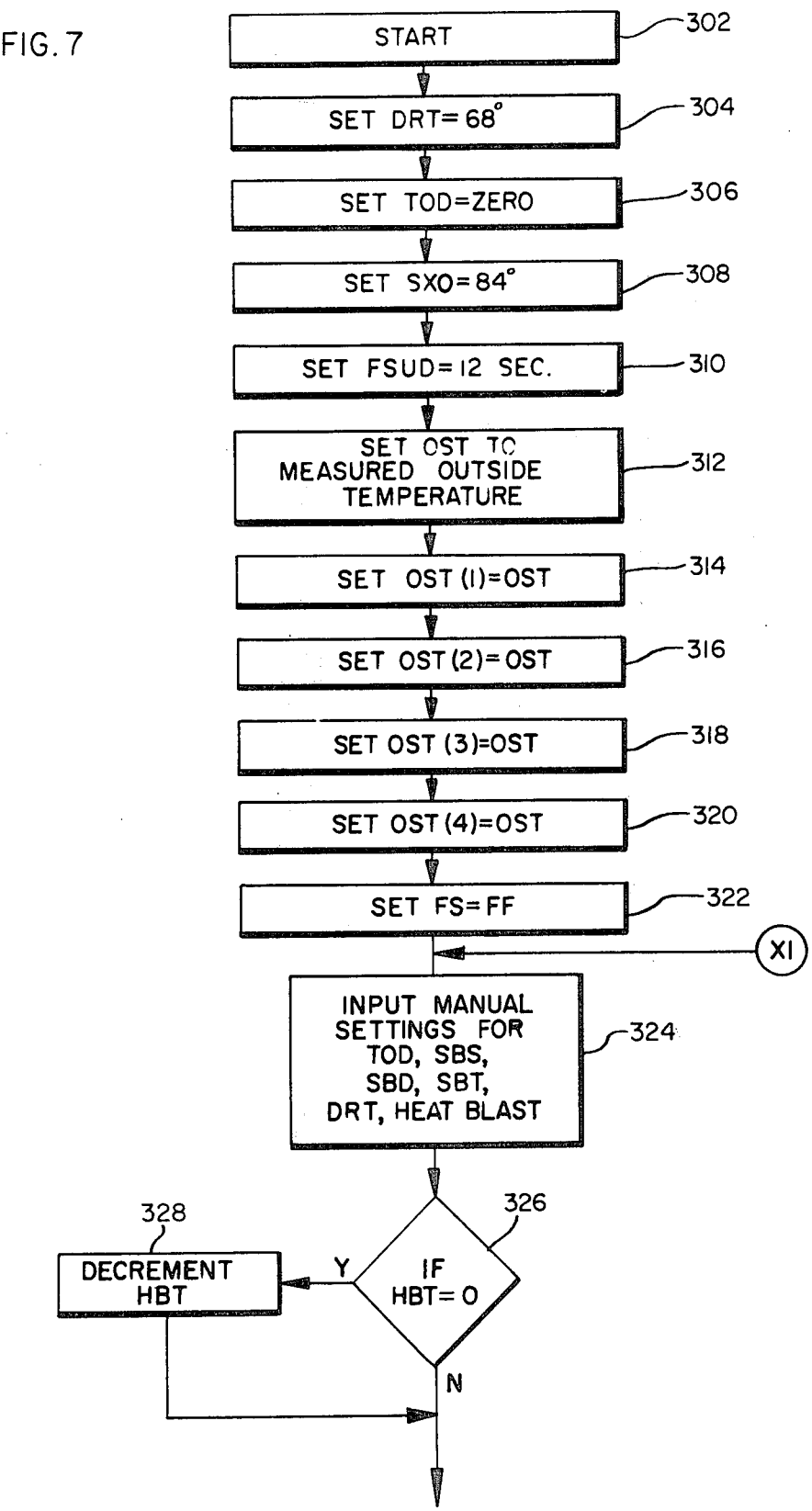
Figure 7B:
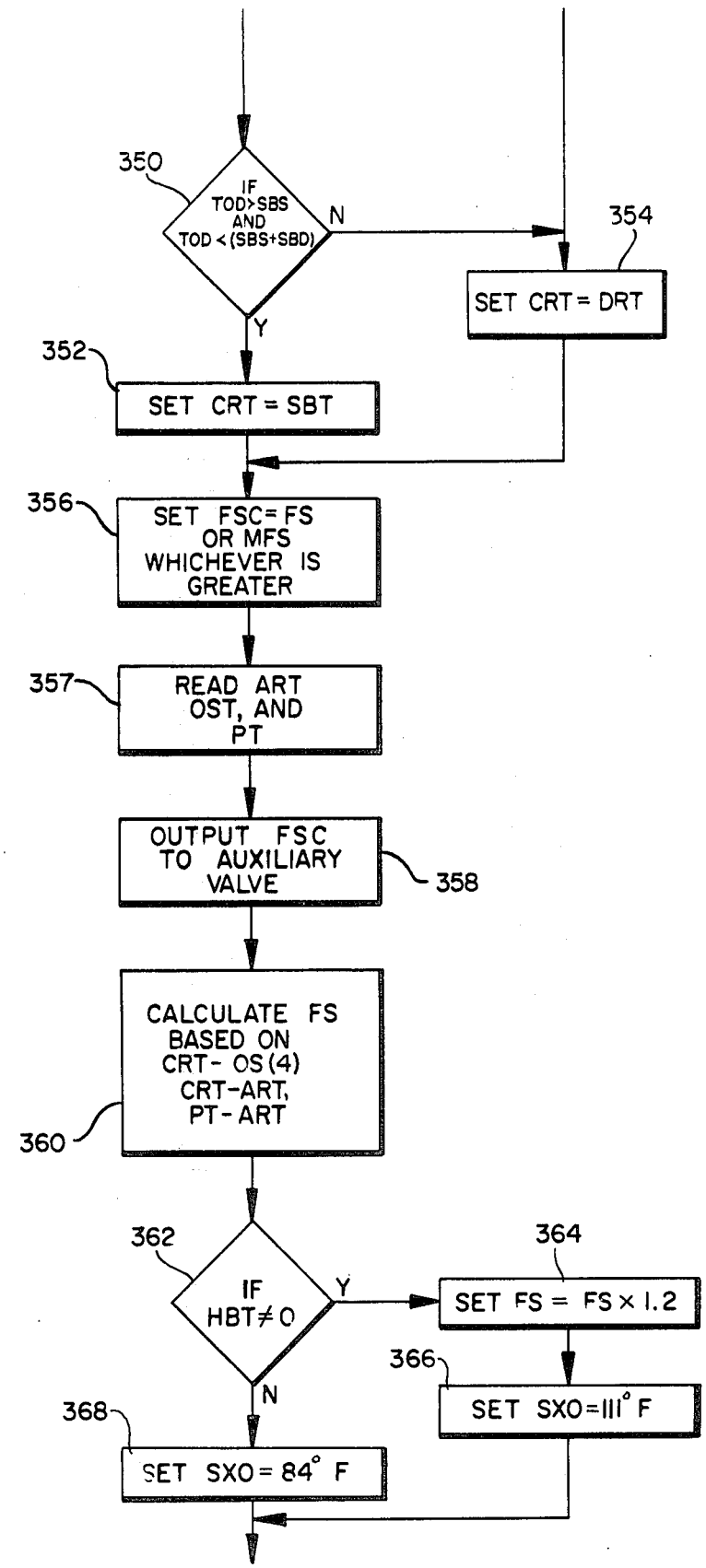

An exemplary flow chart for programming the microprocessor to adjust the rate of fuel to the plenum according to the invention is shown in a FIGS. 7-9. Referring to FIG. 7, after a start instruction 302, the program includes instructions 304–322 for initializing the logic of the microprocessor. Specifically, instruction 304 initializes the desired room temperature equal to 68°, instruction 206 sets time-of-day equal to zero, and instruction 308 sets a variable SXO equal to 84°. The factor SXO is the temperature at which the furnace's fan or blower will turn off when the furnace is cooling down.

At instruction 310, the miporcessor sets another factor FSUD equal to 12 seconds, where FSUD stands for fire start up delay. By this instruction, the furnace will be set full on for 12 seconds to insure that the fire is lit.

By instruction 312, the microprocessor is instructed to set a variable OST (outside temperature) to outside temperature measured by the thermocouple junction 14. Instructions 314–320 set the variables OST (1), OST (2), OST (3), and OST (4) to the value of the outside temperature as determined in instruction 312. Herein, OST (1) refers to the outside temperature of one hour ago, OST (2) refers to the outside temperature of two hours ago, etc. However, on the first pass through the program OST (1)–OST (4) will have all the same value. Instruction 322 causes the microprocessor to set the furnace's fire size to full fire (FF). Later on in the program, fire size is reduced in accordance with the pertinent variables and proportioning factors.

Following instruction 322, an entry point X1 to the program is provided. The program returns to that entry point after executing the instructions described below.

Instruction 324 causes the microprocessor to sense the manual inputs from the switch 254, specifically the setting for time-of-day, setback start time, setback duration, setback temperature, desired room temperature, and heat blast, if any. Following instruction 324, instruction 326 causes the microprocessor to determine whether an internal heat blast timer is equal to zero. That timer causes the heat blast function to be terminated after a predetermined time, such as one hour. A determination that the heat blast timer equals zero means either that the internal timer has timed out or that the heat blast function was not called for by the operator. If the heat blast timer is not at zero, instruction 328 is executed for decrementing the heat blast timer. The program continues with instruction 330 for inquiring as to whether the fire start-up delay is equal to zero (whether the 12 seconds delay has elapsed). If it has elapsed, the program continues to instruction 332. If it has not elapsed, the microprocessor executes instruction 334 for decrementing the fire start-up delay and then proceeding to instruction 332.

By instruction 332, the microprocessor determines if the time-of-day is an even hour. If it is, instructions 335, 336, 338 and 340 are executed for setting OST (4) equal to OST (3), OST (3) equal to OST (2), etc. On the first pass through this part of the program, OST (1) through OST (4) are all equal to the measured outside temperature. However, after the system has been in operation for four hours, the variable OST (4) will be equal to the outside temperature as measured four hours ago, OST (3) will be equal to the outside temperature measured three hours ago, and so on. After the execution of instruction 340, or in the event that the time of day is not an even hour, the microprocessor executes instruction 342. By the latter instruction, a determination is made as to whether the main gas valve is off. If it is, instruction 344 sets the fire start-up delay to 12 seconds. Whether the main gas valve is on or not, instruction 346 is executed to determine whether the heat blast timer is equal to zero. If the heat blast timer has timed out, the program continues to instruction 348 to determine if the setback temperature is equal to zero. If it is not, instruction 350 is executed to determine wether the time-of-day is greater than the setback start time and less than the setback start time plus the setback duration. If it is, this is an indication that the setback mode is in effect, whereupon instruction 352 causes a variable CRT (commanded room temperature) to be set equal to the setback temperature asked for by the operator.

If the heat blast timer does not equal zero, the time-of-day is not within set back range, or if the setback temperature is equal to zero, instructions 346 and 348 proceed to instruction 354 for setting the commanded temperature equal to the desired room temperature, the latter of which has been read as an input from the operator. At this point in the program, the commanded room temperature has been set to either the desired room temperature or the setback temperature. The program which follows calculates the fire size required to bring the temperature of the structure either to the desired room temperature or to the setback temperature.

Instruction 356 sets a fire size command (FSC) variable equal to fire size (FS) or minimum fire size (MFS), whichever is greater. The fire size command is the signal which drives the coil in the auxiliary gas valve to regulate the gas flow therefrom. MFS is a constant in the program and is typically selected to be equal to 20% of full fire. Hence, the fire size command is never below a selected minimum value so that the output of the auxiliary valve is always great enough to sustain a fire safely.

At instruction 357, the microprocessor is instructed to read actual room temperature, outside temperature, and plenum temperature for subsequent calculation of the proper fire size signal. Instruction 358 causes the microprocessor to output the fire size command to the auxiliary gas valve. That command is developed at pins 27–34 of the microprocessor and is indicative of the control current required to develop the proper fire size.

Subroutine 360, described in more detail hereinafter, instructs the microprocessor to calculate fire size based on the difference between the commanded room temperature and the outside temperature four hours ago, and then to refine its calculation of fire size based on the difference between the plenum temperature and the actual room temperature, and also on the difference between the commanded room temperature and the actual room temperature.

Having calculated the fire size according to subroutine 360, the microprocessor executes instruction 362 to determine if the heat blast timer is not equal to zero. If the answer to that inquiry is yes, this indicates that the heat blast function is in effect, wherefore instruction 364 is executed to reset the fire size to the calculated fire size multiplied by a factor of 1.2. Hence, the fire size is increased by a factor of 20%. Next, instruction 366 sets SXO equal to 111° F., thereby setting a new temperature at which the fan or blower of the furnace is turned off as the furnace is cooling down.

If the execution of instruction 362 indicated that the heat blast function either had not been called for or has been completed, the program goes directly from instruction 362 to instruction 368 for setting SXO equal to 84° F.

Instructions 370–376 determine the relationship between plenum temperature and the SXO variable and, based on that determination, either turns the fan off or on. Specifically, instruction 370 inquires as to whether the temperature of the plenum is greater than SXO plus 15°. If it is, instruction 372 causes the fan to be turned on. Instruction 374 determines whether the plenum temperature is less than SXO. If it is, the fan is turned off by instruction 376, and the program proceeds to 378.

Instruction 378 inquires as to whether the fire size is less than the minimum fire size. Normally, the answer to that inquiry will be no and the program will continue to instruction 380. However, there may be period of warm weather during which the fire size (FS) needed to heat the structure to the desired room temperature is less than the minimum fire size (MFS). When that condition exists, the microprocessor executes a subroutine 382 for cycling the main gas valve off and on while the auxiliary gas valve is set for minimum fire size. Details of the subroutine 382 are described hereinafter.

Immediately following the instruction 378, an additional entry point X2 is provided in the program. The first instruction to be executed after the entry point X2 is the instruction 380 in which a pair of variables G and H are set to 4 and 0, respectively. These variables are used in the subroutine 382 which is described hereinafter.

After instruction 380 has been executed, the program returns to instruction 324 via entry point X1 for recalculating fire size on the basis of the sensed temperatures and the variables manually selected by the operator.

The subroutine 360 by which the microprocessor calculates fire size is shown in flow chart form in FIG. 8. The first instruction 384 of that subroutine calculates fire size as a function of the difference between the commanded room temperature and the outside temperature which existed four hours ago. In this calculation, commanded room temperature is desired room temperature when setback is not in effect. When setback is in effect, commanded room temperature is the setback temperature (see instructions 350 and 352). At this point in the program, therefore, the proper fire size and, hence, the rate of gas input to the furnace, is forecast on the basis of commanded room temperature and outside temperature. The difference between those temperatures is preferably multiplied by the outside fire ratio (OFR) factor as indicated in instruction 384.

Instructions 386-394 further refine the fire size calculation on the basis of the difference between the plenum temperature and the actual room temperature. The first instruction in this sequence, instruction 386, defines a factor A as equal to commanded room temperature minus actual room temperature plus the outside temperature as it was four hours ago. The calculated factor A is used in instruction 388 to determine another factor B which is equal to A times another factor entitled "KST" which is indicative of the number of degrees the plenum temperature must increase for each degree increase in the difference between the outside temperature and the structure temperature to hold the structure at a constant temperature. The appropriate value for KST may be obtained by starting the furnace and, when equilibrium is reached, measuring plenum temperature, structure (room) temperature, and outside temperature. KST is calculated by determining the difference between the plenum temperature and the structure temperature and dividing that difference by the difference between the structure temperature and the outside temperature. Typically, KST ranges from about 0.7 in cold temperature regions to about 2.5 in warm temperature regions.

In effect, instruction 388 predicts what the plenum temperature should be for given sensed temperatures. In instruction 390, a factor C is calculated which is equal to factor B minus the difference between the plenum temperature and the actual room temperature. This factor C is indicative of any unpredicted variation in plenum temperature. Instruction 392 calculates another factor D equal to PFR times the factor C calculated in instruction 390. The result, D, is representative of the fire size correction needed to eliminate any error in the plenum temperature. Then instruction 394 is executed to reset the fire size to the previously calculated fire size plus the factor D calculated in instruction 392. Hence, the new fire size is equal to the old fire size plus increment D.

Instructions 396-400 further refine the fire size calculation on the basis of the difference between the commanded room temperature and the actual room temperature. Instruction 396 calculates a factor E equal to the difference between the commanded room temperature and the actual room temperature. The resultant, E, is preferably utilized in instruction 398 to calculate another factor F equal to the product of E and the structure fire ratio. The calculated factor F is the fire size increment for further refining the size of the flame to bring the room temperature right up to the commanded room temperature, and instruction 400 calculates a new fire size base on the increment F.

After calculating the fire size in instruction 400, the program eventually proceeds to function 356 in which the fire size command (FSC) signal is set equal to the fire size signal just calculated. Then, in instruction 358, the fire size command signal is sent as an output to the auxiliary gas valve. In FIG. 6, the fire size command signal is an 8 bit digitanl signal at pins 27-34 of the microprocessor, which signal is applied to pins 5-12 of the converter 242. The converter 242 then develops at its output lead 4 an analog signal representative of the fire size command signal. The amplifier 286 receives the analog signal and biases the transistors 288 and 290 so that the proper current is fed through the coil 172 of the auxiliary gas valve.

The subroutine 382 for cycling the main gas valve between its off and on positions is shown as a flow chart in FIG. 9. It begins with instruction 402 to determine if the variable G is equal to zero. This variable is the same variable G shown in instruction 380 wherein G was set to four. In the actual program, the number 4 is representative of an interval of 12 seconds. If variable G is not equal to zero, instruction 404 is executed for decrementing G and then instruction 406 is executed for turning the main gas valve on. Thereafter, the program returns via entry point XI to instruction 324 for again cycling through the program.

If G had been determined to be equal to zero in instruction 402, instruction 407 is executed to increment the value of H, and then instruction 408 is executed to determine the value for H as indicated. If H is greater than minimum fire size plus four (typically after about 180 seconds), the program returns to instruction 380 via the entry point X2. Otherwise, instruction 410 is executed to determine if H is greater than the fire size. If it is not, instruction 412 causes the main gas valve to be turned on and the program returns to instruction 324 via entry point X1. Otherwise, instruction 414 is executed to turn the main gas valve off. Suffice it to say with respect to this subroutine that the system can operate at any point betwen a condition where the main gas valve is on for 12 seconds and off for 180 seconds, or on for 180 seconds and off for 12 seconds. During this period, the auxiliary gas valve is set to minimum fire size.

The flow charts described above illustrate an exemplary program by which the system of FIG. 6 may be controlled. It will be appreciated that other programs, sequences of instructions and equations may also be employed for the system of FIG. 6 to carry out the method of the invention. One program which contains the logic of the flow charts described above and which has been found to work satisfactorily is included in the appendix hereto.

Although there are structural differences and other differences between the systems of FIG. 1 and FIG. 6, they both produce substantially the same result of forecasting the fire size required on the basis of the difference between the desired room temperature and the outside temperature. That forecast is preferably made by taking into account the outside fire ratio described hereinabove. In addition, both systems further refine the fire size as a function of the difference between the plenum temperature and the actual room temperature, again taking into account variables such as the PFR factor. Further refinement in the fire size is effected as a function of the difference between the desired room temperature and the actual room temperature, preferably taking into account the structure fire ratio factor.

A large number of advantages accrue as a result of the invention. Most significantly, a great deal of fuel is saved while yet maintaining the temperature of the structure at an even, desired temperature. It has been found thus far that fuel savings of from 25% to 50% result, depending on the type of structure and its location. Also, because the temperature of the plenum tends to remain much lower than in a conventional furnace system, flue losses are reduced. As a result, there is less updraft, less heated air lost, and less outside cold air leaking into the structure to replace air which exits the flue.

In addition, a furnace modified according to the invention produces a very even, constant temperature with very little temperature overshoot or undershoot. As a result, there is little or no tendency to readjust the desired structure temperature as there is with conventional furnace systems.

Another significant advantage results from the fact that a furnace employing the invention delivers air heated to a lower temperature than air from conventional furnaces. Accordingly, the air in the structure tends to retain much more of its water than in structures having conventional furnaces. Accordingly, the need for a humidifier in a structure employing a furnace modified according to the invention is greatly reduced or even eliminated, the air within the structure tending to remain within a comfortable humidity range.

Also significant is the fact that the furnace is made no less safe when modified according to the invention. All conventional, existing safety systems remain intact and operational. Should the present system somehow fail, or a leak occur in the auxiliary valve, control over the furnace returns to the conventional system. In addition, furnace ignition is reliably achieved because the present sytem always starts the furnace at a high fire size and then backs off to a lower fire size. Furnace ignition is also made easier because of the fact that the temperature of the flue generally remains lower than in conventional heating systems.

Higher heating efficiency is also effected by virtue of the fact that the speed of the furnace's fan or blower may be increased when the furnace's fire is of proper size, irrespective of plenum temperature. In contrast, conventional systems drive the fan or blower only when the plenum temperature reaches a selected high temperature. As a result, conventional systems lose heat up the flue as the plenum is heating up, even though fire size is high. By starting the fan sooner in the present system, less heat is lost up the flue, and the furnace's heat exchanger remains cooler and operates more efficiently.

Another significant advantage is that a furnace modified according to the present invention tends to last longer than conventional furnaces because the modified furnace usually operates at relatively low temperatures. Hence, there are fewer and more gradual temperature changes to cause stress on the furnace components. Moreover, because the furnace tends to run substantially continuously, many moving parts associated with the furnace undergo less stress.

Although the valve has been described in connection with the disclosed heating system, it is also useful in other applications. For example, the valve is useful in a variety of applications where it is desired to control fluid flow or pressure with an electrical control signal.

Although the invention has been described in terms of specific preferred steps and structure in connection with a gas fueled furnace, it will be obvious to those skilled in the art that many alterations and modifications thereto may be made without departing from the invention. For example, the invention may be employed with hot water, oil and other types of heating systems. In addition, the temperature indicating signals utilized in the invention may be proportioned in a manner other than the preferred proportions described herein, or the proportioning may be omitted entirely. Many other such alterations and modifications to the method and structure described herein will be apparent to those skilled in the art. Accordingly, it is intended that all such alternations and modifications be included within the spirit and scope of the invention as defined by the appended claims.

What is claimed is:

1. In a fluid flow valve having fuel inlet and outlet ports, having a flow restriction device for altering the flow of fluid between the inlet and outlet ports, and having a diaphragm for biasing the restriction device in a position to effect a given fluid pressure at the outlet port, the improvement comprising:
   an annular magnet having north and south poles separated by a circular groove;
   an armature coil form riding in said groove;
   a coil wound on said coil form and receiving a control current indicative of a desired fluid pressure at the outlet port for developing a mechanical force on said coil form in response to the control current, said coil form being constructed of non-ferrous metal for damping its movement and for conducting heat away from the coil; and
   a flexible cable coupled between said armature coil form and the restriction device for responding to the force developed by the coil form so as to vary the bias on the restriction device and vary the fluid pressure at the outlet port at equilibrium.

2. In a gas valve having a gas inlet and a gas outlet in mutual communication via a gas flow conduit, having a movable restriction device in the conduit for altering the gas pressure at the outlet port, having a diaphragm one side of which is in pressure communication at the outlet port and coupled to the restriction device for holding the latter at a desired restriction position and having an opposite side in communication with a reference chamber, and having means for force biasing the diaphragm so as to position the restriction device for developing a given gas outlet pressure at equilibrium, the improvement comprising:
   electro-magnetic means adapted to receive a control signal for developing a mechanical force as a function of the control signal and;
   flexible bellows means responsive to the mechanical force for transmission of said force to the diaphragm for controlled movement of the diaphragm and the restriction device, said bellows means being mounted to isolate the reference chamber from said electro-magnetic means, whereby said bellows means prevents gas from reaching said electro-magnetic means in the event of a break in the diaphragm and whereby receipt of a control signal causes said electro-magnetic means to flex said bellows means, resulting in movement of said diaphragm and the restriction device for altering the outlet pressure of the gas at equilibrium.

3. The improvement as set forth in claim 2 wherein said electro-magnetic means includes a magnet-coil combination adapted to receive the control signal and an armature associated with said combination for moving in response to said control signal, and wherein said armature is coupled to said bellows means for altering the force on the latter.

4. The improvement as set forth in claim 2 wherein said bellows means includes first and second bellows, the first bellows being coupled to the diaphragm for transmitting motion thereto, said second bellows being mounted to seal the first bellows from the atmosphere and so as to define a low pressure chamber between the first and second bellows, and wherein said second bellows is coupled to said electro-magnetic means.

5. The improvement as set forth in claim 4 including spring means disposed in said chamber for biasing said first and second bellows apart, whereby a leak in either of said first or second bellows causes the spring means to urge said bellows apart in opposite directions, said first bellows being urged in the direction of the diaphragm to permit the latter to assume a substantially unbiased position.

6. The improvement as set forth in claim 5 wherein said first bellows is disposed with respect to the diaphragm so as to define a reference chamber between the diaphragm and the first bellows, wherein the first and second bellows each include a closed end and an open end, and further including a support for mounting said first and second bellows such that the open ends of said bellows are independently sealed to said support, and said support seals the low pressure chamber and the reference chamber from the atmosphere.

7. The improvement as set forth in claim 5 including a switch mounted adjacent said bellows so as to be actuated by the motion of the bellows when urged apart by said spring, said switch being adapted to signal a leaking condition of the bellows.

8. In a fluid flow valve having a fluid inlet and a fluid outlet in mutual communication via a fluid flow conduit, having a pressure regulating diaphragm in fluid pressure communication with the outlet port, the improvement comprising:

a first flexible bellows mounted to define an isolated presure region between the diaphragm and said first bellows, a cable connecting said first bellows to the diaphragm for pulling the diaphgram upwardly in response to upward force upon the first bellows;

a second bellows mounted so as to seal said first bellows from the atmosphere and so as to define a low pressure chamber between said first and second bellows;

a spring compressed between said first and second bellows; and means adapted to receive a control signal for applying an upward force on said second bellows when a change in fluid pressure at the outlet port is desired, whereby force on said second bellows is transmitted to the diaphragm via said low pressure chamber, said first bellows and the cable coupling the first bellows to the diaphragm, and whereby fluid leaking through the diaphragm is doubly isolated by said first and second bellows, and a leak in either of said first and second bellows causes said spring to urge the bellows apart so as to impart maximum fluid pressure at the outlet.

9. The improvement as set forth in claim 8 further including a spacer disposed between said first and second bellows to limit the compression of said spring so as to provide a minimum, predetermined separation between said first and second bellows.

* * * * *